United States Patent [19]
Shelef

[11] Patent Number: 6,117,581
[45] Date of Patent: Sep. 12, 2000

[54] FUEL CELL ELECTRODE COMPRISING CONDUCTIVE ZEOLITE SUPPORT MATERIAL

[75] Inventor: Mordecai Shelef, Bloomfield Village, Mich.

[73] Assignee: Ford Global Technologies, Inc., Dearborn, Mich.

[21] Appl. No.: 09/268,126

[22] Filed: Mar. 15, 1999

[51] Int. Cl.[7] .................................................. H01M 4/86
[52] U.S. Cl. .............................. 429/44; 429/40; 429/41; 429/33
[58] Field of Search .................................. 429/40, 44, 33, 429/41

[56] References Cited

U.S. PATENT DOCUMENTS

| | | |
|---|---|---|
| 3,134,697 | 5/1964 | Niedrach . |
| 4,359,406 | 11/1982 | Fung ......................................... 429/40 |
| 5,272,017 | 12/1993 | Swathirajan et al. . |
| 5,702,838 | 12/1997 | Yasumoto et al. ........................ 429/40 |
| 5,707,755 | 1/1998 | Grot . |

OTHER PUBLICATIONS

"Inclusion Of Conducting Polymers In Inorganic Hosts: Towards Conducting Nanostructures", T. Bein et al, Intrinsically Conducting Polymers; An Emerging Technology, Kluwer Academic Publishers, 1993, pp. 51–60, No Month Available.

Kirk Other's Encyclopedia of Chemical Technology, vol. 15, 4th Ed. 1995, pp. 888–925, No Month Available.

"Can We Syntehsise a Dense Bundle of Quasi One–dimensional Metallic Wires?", Peter P. Edwards et al, Materials Science and Engineering A217/218, 1996, pp. 198–202, No Month Available.

*Primary Examiner*—Bruce F. Bell
*Attorney, Agent, or Firm*—Damian Porcari; Roger L. May

[57] ABSTRACT

A polymer-electrolyte-membrane fuel cell assembly comprising an ionomeric, conducting polymer membrane, an anode on a first face of the polymer membrane, a cathode on a second face of the polymer membrane, at least one of the anode and the cathode each comprising catalyst support material comprising conductive zeolite particulate material, and noble metal catalysts supported on the catalyst support material.

15 Claims, 1 Drawing Sheet

FUEL CELL ELECTRODE COMPRISING CONDUCTIVE ZEOLITE SUPPORT MATERIAL

TECHNICAL FIELD

The present invention relates to a polymer-electrolyte-membrane fuel cell electrode assembly comprising a conductive particulate zeolite catalyst support material.

BACKGROUND OF THE INVENTION

Fuel cells are projected for use as a power source for electric vehicles and other applications. A fuel cell is a device which converts the energy of a chemical reaction into electricity. It differs from a battery in that the fuel and oxygen are stored external to the cell, which can generate power as long as the fuel and oxygen are supplied. A fuel cell having a solid polymer electrolyte is known as a polymer-electrolyte-membrane fuel cell (PEM FC).

A PEM FC typically comprises a first electrode, (i.e., an anode), a second electrode, (i.e., a cathode) and a solid polymer electrolyte membrane. The cathode and the anode are secured to opposite sides of the membrane so that the cathode is separated from the anode by the solid polymer electrolyte membrane. The fuel, typically hydrogen, is supplied to the anode, and oxygen, typically in the form of air, is supplied to the cathode. The hydrogen molecules disassociate at the anode to form protons and electrons and the oxygen molecules dissociate at the cathode to form oxygen atoms. The protons pass through the polymer electrolyte membrane from the anode to the cathode to react with the dissociated oxygen atoms formed at the cathode while the electrons, which produce the electric current, traverse an external circuit. The protons, electrons and oxygen recombine at the cathode to form water.

Each electrode (i.e., the anode and the cathode) comprises a catalyst to facilitate the reactions occurring thereat. The catalyst is typically a particulate noble metal such as platinum and is dispersed and supported on a high surface area support material.

The support material in the PEM fuel cell typically consists exclusively of carbon particles. Carbon has good electrical conductivity which helps facilitate the passage of the protons and electrons from the catalyst and electrode to the polymer electrolyte membrane and to the external circuit. To promote the formation and transfer of the protons and electrons, and to prevent drying out of the membrane, the fuel cells are operated under hygroscopic conditions. To generate these aqueous condition, the solid polymer electrolyte membrane is usually hydrated (i.e., by boiling in water) prior to its introduction into the fuel cell and the hydrogen fuel and oxygen gases are humidified prior to entry into the fuel cell.

Notwithstanding the good electrical conductivity of carbon, carbon is relatively hydrophobic, and as such, the boundary contact between the reactive gases, the water and the surface of the solid electrodes made exclusively of carbon contributes to high electrical contact resistance and ohmic power loss in the fuel cell. This diminishes the efficiency of the fuel cell. Accordingly, it is an object of the present invention to provide an electrode for use in a polymer-electrolyte-membrane fuel cell which has lower resistance and less ohmic power losses than electrodes which employ the use of carbon material exclusively as its support material.

Moreover, the majority of the costs associated with electrodes is attributed to the high cost of the noble metal which makes up the catalyst. Only those catalytic sites exposed on the surface of the catalytic particles contribute to the catalytic activity of the electrode, and thus, electrodes with the highest fraction of the noble metals accessible to the reaction, i.e., those with the highest dispersion, are optimal. The extent of dispersion of the noble metal catalyst on the support material, and the stability of such high dispersion in use, i.e., resistance of the catalyst against agglomeration, is directly related to the surface area and the availability of surface sites on which the dispersed noble metal can be anchored. Carbon support material typically has a surface area of about 10–50 $m^2/g$ and a relatively low surface density of available anchoring surface sites. This is because carbon materials are for the most part graphitized. In graphitic carbons, the major part of the exposed surface consists of chemically inert basal planes with the "edge" planes on which the anchoring sites are located representing only a small percentage of the carbon support surface.

It would be desirable to provide a catalytic support which has a higher stable surface area and also a higher surface density of anchoring surface sites than catalytic supports consisting exclusively of carbon. This would increase the dispersion of the noble metal catalyst and thus limit the amount of catalyst needed. As such, it is another object of the present invention to provide a fuel cell polymer-electrolyte-membrane electrode which can be made less costly than electrodes having exclusively carbon support material.

Furthermore, it is desirable to provide an unimpeded access of the gaseous hydrogen fuel and oxygen reactants to the active noble metal catalysts in order to avoid diffusional limitations on the amount of power drawn from the electrode. Accordingly, it is another object of the present invention to provide a catalyst support which has improved gas permeability relative to supports made exclusively of carbon.

Disclosure of the Invention The present invention meets the above and other objects by providing an electrode for use in a polymer-electrolyte-membrane fuel cell. The electrode comprises catalyst support material comprising conductive particulate zeolite material, and noble metal catalysts supported on the catalyst support material.

Moreover, the present invention further provides a polymer-electrolyte-membrane fuel cell comprising an ionomeric, conducting polymer membrane, a first electrode on a first face of the polymer membrane, and a second electrode on a second face of the polymer membrane. At least one of the electrodes comprises a catalyst support material comprising conductive zeolite particulate material, and noble metal catalysts supported on the catalyst support material.

The conductive zeolite material contains acidic protonic entities on its surface which make it more hydrophilic than carbon and, thus, when used as a catalyst support in PEM FC electrodes, results in lower resistance and less ohmic power losses than electrodes which employ the use of carbon material exclusively as its support material. The conductive zeolite material also enables a relatively high dispersion of the catalytic noble metals and, because of its array of channels, allows for a relatively high gas permeability.

BEST MODES FOR CARRYING OUT THE INVENTION

Figure 1:
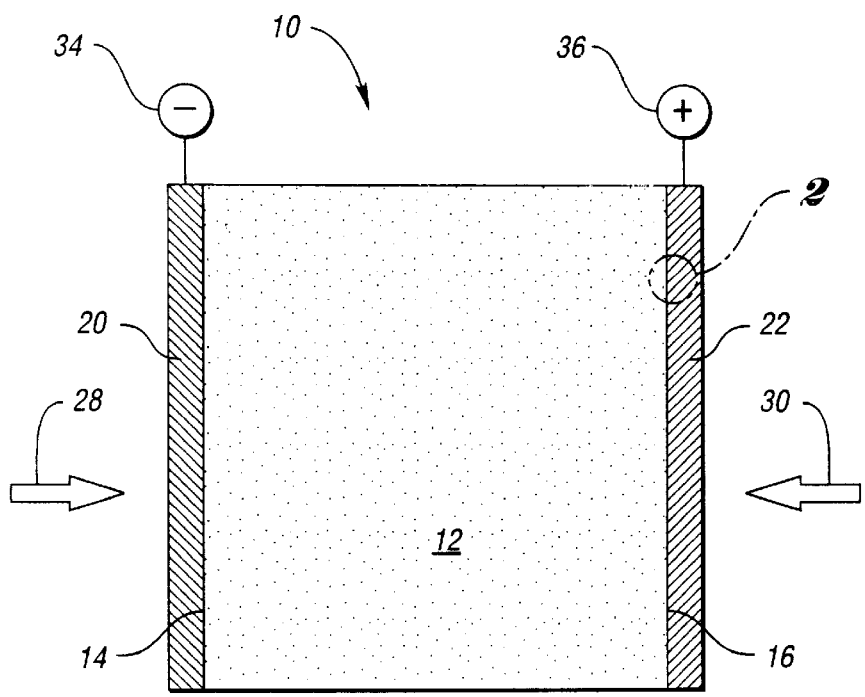
FIG. 1 is a cross-sectional view of a fuel cell of the present invention.

Referring to FIG. 1, a fuel cell assembly 10 of the present invention is shown. The fuel cell assembly 10 comprises a solid polymer electrolyte membrane 12 having a first surface 14 and a second surface 16. The fuel cell assembly 10 further includes a first electrode, i.e., an anode 20, which is supported on the first surface 14 of the membrane 12, and a second electrode, i.e., a cathode 22 which is supported on the second surface 16 of the membrane 12.

Hydrogen fuel 28 is supplied to the anode 20 of the fuel cell 10 while oxygen containing gas 30 is supplied to the cathode 22 of the fuel cell 10. At the anode 20, the hydrogen fuel 28 reacts to form protons which migrate through the membrane 12 to the cathode 22 and electrons which traverse an external circuit to the cathode. At the cathode 22, the oxygen molecules in the oxygen containing gas 30 dissociate to form dissociated oxygen atoms which situate themselves on the surface of the catalyst of the cathode. The dissociated oxygen atoms formed at the cathode 22 react at the cathode with the protons and the electrons to form a reaction product (water). The fuel cell assembly 10 includes an anode connection 34 and a cathode connection 36 which interconnect with the external circuit or other fuel cell assemblies to remove the electrical current generated by the fuel cell assembly 10.

The anode and cathode reactions in fuel cells employing hydrogen as the fuel and oxygen as the oxidant are shown in equations I and II below:

Anode Reaction $H_2 \rightarrow 2H^+ + 2e^-$ (I)

Cathode Reaction $\frac{1}{2}O_2 + 2H^+ + 2e^- \rightarrow H_2O$ (II)

The hydrogen fuel 28 can be supplied in the form of substantially pure hydrogen or as a hydrogen-containing reformate, for example, the product of the reformation of methanol and water or the product of the reformation of natural gas or of other liquid fuels. Hydrogen containing streams may also be produced by other means such as the partial oxidation of liquid fuels combined with a "water-gas shift" catalytic process. Similarly, the oxygen containing gas 30 can be provided as substantially pure oxygen or the oxygen can be supplied from air at ambient or elevated pressure. The hydrogen fuel 28 and the oxygen containing gas 30 are preferably humidified prior to being supplied to the fuel cell assembly 10.

Polymers suitable for the membrane 12 are well known in the art. Examples of suitable polymers are described in U.S. Pat. Nos. 5,272,017 and 3,134,697 as well as in other patents and non-patent literature. The composition of the membrane 12 is not critical to the present invention and may comprise any of the proton conductive polymers conventionally used in the prior art, including the perfluorinated sulfonic acid polymers such as NAFION™ from the E. I. Dupont De Nemours and Company, as well as other membranes such as Gore Select™ from the Gore Company. The membrane 12 is hydrated or saturated with water molecules to promote ion formation and transport. The membrane 12 is preferably hydrated by any suitable means, and is preferably hydrated by being boiled in water prior to installation in the fuel cell assembly 10.

Figure 2:
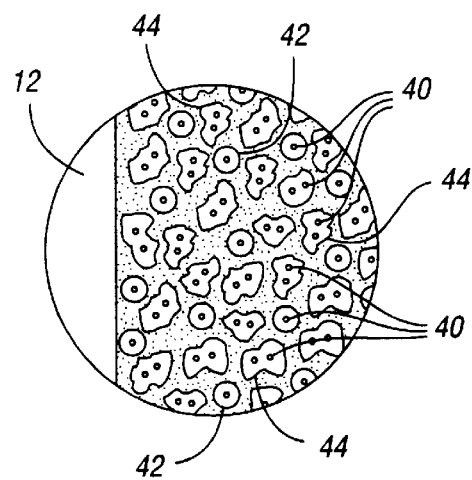
FIG. 2 is a magnified view of a portion of FIG. 1 in accordance with a first embodiment of the present invention.

Each electrode 20, 22, as best shown in FIG. 2, comprises catalytic particulate material 40 to catalyze the electrochemical reactions occurring on the electrode. Particulate noble metals are typically employed as the catalytic material 40. Suitable noble metals include platinum, palladium, ruthenium, rhodium, osmium, iridium, and their alloys. Platinum, or platinum alloys, is the preferred noble metal catalytic material but in certain embodiments the noble metal may be modified by "oxophilic" components such as molybdenum or tungsten. The catalytic particulate material 40 is supported on a particulate support material.

In a first embodiment of the present invention, the support material, as best shown in FIG. 2, comprises an intimate mixture of particulate carbon and conductive zeolite 42 and 44. The support material preferably comprises between about 90 to about 10 weight percent carbon and between about 10 to about 90 weight percent conductive zeolite. The support material more preferably comprises between about 70 to about 50 weight percent carbon and between about 30 to about 50 weight percent conductive zeolite. The support material most preferably comprises about 65 weight percent carbon and about 35 weight percent conductive zeolite.

The carbon material 42 can comprise any carbon which has been used in the prior art. Suitable examples of carbon include, but are not limited to, carbon black, graphite, partially graphitized carbon, and acetylene black. Preferably, the carbon material 42 is carbon black, which is available from the Cabot Company of Boston, Mass. Preferably, the carbon material 42 has a surface area of between about 10 to about 50 $m^2/g$.

The conductive zeolite 44 comprises zeolites which have been made conductive by incorporating a conductive material into the channels of the host zeolite.

Zeolites are crystalline open framework aluminosilicates which have the general formula:

$M(x/n) [(AlO_2)x(SiO_2)y]$ wherein M represents a positively charged ion which compensates the negative charge associated with the replacement of a tetravalent Si-ion by a trivalent Al-ion in the zeolite crystal structure. Preferably, M represents a proton that confers high hydrophilic properties to the surface of the zeolite.

Zeolites comprise a plurality of one-, two- or three-dimensional channels running throughout the zeolite material. The channels have a diameter of between about 0.3 to about 3 nanometers (nm). The preferred channel diameters required to accommodate the incorporation of conductive materials are in the higher range of pore diameters, such as above about 0.6 nm.

The zeolite preferably has a surface area of between about 100 to about 400 $m^2/g$. The zeolites contain acidic protonic entities on its surface and as such is more hydrophilic than carbon. Examples of suitable types of zeolites which may be used include, but are not limited to, Linde A, Faujasite, Mordenite, Omega, L, Y, Beta, SAPO-5, ZSM-5, AIPO-5, VPI-5 and MCM-41. Other zeolites which may be used in the present invention include, but are not limited to, zeolites referred to in Kirk Othmer's Encyclopedia of Chemical Technology, Vol. 16, pp. 888–925, 4th Ed., 1995, which is incorporated herein by reference.

The conductive material which may be incorporated into the channels of the zeolite comprises conductive polymer, alkaline metal cations, or a combination thereof.

Conductive polymers which may be used as the conductive material of the present material include but are not limited to undoped or doped polyacetylene, polypyrrole, polythiophene, polyaniline and mixtures thereof. The conductive polymer may be polymerized within the channels of dehydrated zeolite in any manner which is known in the art. Zeolites are considered to be dehydrated when the water, which is typically contained within its channels, has been removed from the channels. This is typically done by heating the zeolite to evaporate the water.

Typically, precursor monomers of the desired conductive polymer are introduced into the channels of the dehydrated zeolite host and are subsequently polymerized within the channels by appropriate polymerization catalysts. The polymerization reactions are typically carried out between temperatures of about 298 to about 550K and at pressures between about 10 to 1,000 Torr. To enhance the conductivity of the conductive polymers introduced into the zeolite channels, the polymers can be partially or wholly pyrolyzed.

Suitable examples of the manner in which the conductive polymers may be polymerized within the channels of the zeolites are disclosed in "Inclusion Of Conducting Polymers In Inorganic Hosts: Toward Conducting Nanostructures", T. Bein and P. Enzel, Intrinsically Conducting Polymers: An Emerging Technology pgs. 51–60, 1993, Kluwer Academic Publishers which is incorporated herein by reference.

When the conductive material comprises alkaline metal cations, the channels of zeolite can be doped with "excess electrons" by reacting the cations already contained within the channel with suitable alkaline metal vapors such as, but not limited to, potassium, lithium, sodium, rubidium and cesium, in any suitable manner known in the art. The "excess electrons" are due to the ionization of the incoming alkali metal atoms by the intense electric fields within the zeolite channels. This releases electrons which interact with metal cations present in the zeolite.

A suitable example of such a manner is described in "Can We Synthesise A Dense Bundle Of Quasi One-Dimensional Metallic Wires?", Peter P. Edwards, Paul A. Anderson, Lee J. Woodall, Adrian Porch, and A. Robert Armstrong, Materials Science and Engineering A217/218 (1996) 198–202, which is incorporated herein by reference.

It should be noted that the conductive material could, conceivably, be a combination of a conductive polymer material and alkaline metal cations incorporated into the same individual channels of the same zeolite. Alternatively, it is feasible to mix, in desired proportions, zeolite grains of both materials, wherein one comprises a conductive polymer within its channels and the other contains alkali metal ions.

Figure 3:
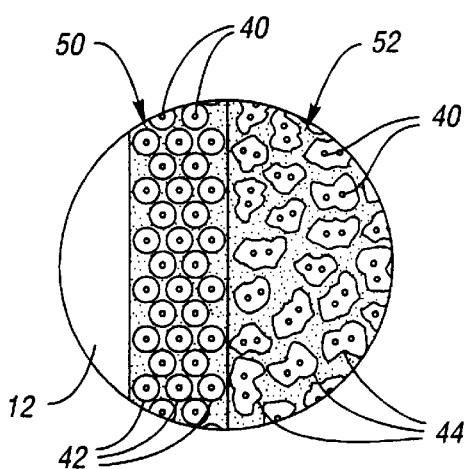
FIG. 3 is a view similar to FIG. 2 illustrating a second embodiment of the present invention.

Referring to FIG. 3, an alternative embodiment of the electrodes 20, 22 is shown. The electrodes 20, 22 comprise a first layer 50 of electrode material which is adhered to the membrane 12, and a second layer 52 of electrode material which is adhered to the first layer 50 of electrode material such that the first layer 50 of electrode material is disposed between the membrane 12 and the second layer 52 of electrode material. The first layer 50 of electrode material comprises carbon particles 42 supporting catalytic particulate material 40. The carbon particles and catalysts 42 and 40, respectively, usable in the second embodiment are the same as those described in the first embodiment.

The second layer 52 of electrode material comprises conductive zeolite 44 supporting catalytic particulate material 40. The conductive zeolite 44 is the same conductive zeolite disclosed in the first embodiment.

Each layer 50 and 52 of electrode material is preferably about 5 microns to about 25 microns thick, and most preferably about 10–15 microns thick.

The electrodes 20, 22 can be prepared in any suitable manner known in the art. Typically, the catalytic particulate material 40 is deposited on the particulate catalytic support material and the resulting material is suspended in a liquid carrier to form an ink which is hot-pressed onto the membrane 12 to form the electrodes 20 and 22.

For instance, in the first embodiment, the particulate zeolite 44 and the particulate carbon 42 are intimately mixed and then the catalytic particles 40 are uniformly dispersed on the intimate mixture. The intimate mixture having the catalytic particles 40 deposited thereon is then mixed in a liquid to form an ink. Alternatively, the carbon and the conductive zeolite can be added separately in the proper proportions to the liquid carrier and intimately mixed as a suspension to form the ink.

The ink is then hot-pressed onto the first and second surfaces 14 and 16, respectively, of the membrane 12 in any suitable manner to form the fuel cell 10. One such suitable manner is to hot-press the ink directly onto the first and second surfaces 14 and 16 of the membrane 12. Another suitable manner is to first coat the ink onto a gas permeable conductive paper, such as carbon paper, and then hot-press the ink and the carbon paper onto the first and second surfaces 14 and 16 of the membrane 12. In yet another suitable manner, the ink is coated onto a carrier paper, such as Teflon paper. The coated Teflon paper is then hot-pressed onto the first and second surfaces 14 and 16 of the membrane 12 and the Teflon paper is peeled away from the fuel cell 10.

In the second embodiment, the catalytic particles 40 are uniformly dispersed on the carbon particles 42 which is then mixed with a liquid to form a first ink. The conductive zeolite 44 is uniformly coated with catalytic particle material 40 and the coated conductive zeolite is then mixed in a liquid to form a second ink. The first and second inks are then successively hot-pressed directly onto the membrane 12 or successively coated onto a conductive paper or other carrier paper which is then hot-pressed onto the membrane.

It should be noted that the ink(s) and therefore electrodes 20, 22, in addition to the catalytic particulate material 40, the carbon 42 and conductive zeolite 44, can include a suitable binder material or a proton conducting material as is known in the art.

Since the catalytic support material includes conductive zeolite, the electrode can be made with a relatively smaller amount of catalytic particles without appreciating any loss in catalytic activity since the surface area of the conductive zeolite enables a greater dispersion of the catalytic particles. Moreover, the conductive zeolite material being a hydrophillic material improves the wetability of the electrode and thus decreases the ohmic power loss and resistance of the electrode and the fuel cell. Also, the porous nature of the zeolite support material provides relatively improved gas permeability and minimizes the drawbacks associated with restricted gas diffusion in the electrodes.

While the best modes for carrying out the invention have been described in detail, those familiar with the art to which this invention relates will recognize various alternative designs and embodiments for practicing the invention as defined by the following claims.

What is claimed is:

1. An electrode for use in a polymer-electrolyte-membrane fuel cell, the electrode comprising:
   catalyst support material comprising conductive particulate zeolite material; and
   noble metal catalysts supported on the catalyst support material.

2. The electrode of claim 1 wherein the zeolite includes continuous channels, the zeolite containing conductive material within the channels.

3. The electrode of claim 2 wherein the conductive material comprises alkali metal cations.

4. The electrode of claim 2 wherein the conductive material comprises a conductive polymer.

5. The electrode of claim 4 wherein the conductive polymer is selected from the group consisting of polyacetylene, polypyrrole, polythiophene, polyaniline and mixtures thereof.

6. The electrode of claim 1 wherein the catalyst support material further comprises carbon particles mixed with the zeolite material.

7. The electrode of claim 1 wherein the catalyst support material further comprises carbon particles, the carbon particles being layered adjacent to zeolite particulate material.

8. A polymer-electrolyte-membrane fuel cell assembly comprising:
   an ionomeric, conducting polymer membrane;
   a first electrode on a first face of the polymer membrane;
   a second electrode on a second face of the polymer membrane;
   at least one of the electrodes comprising catalyst support material comprising conductive zeolite particulate material and noble metal catalysts supported on the catalyst support material.

9. The polymer-electrode-fuel cell assembly of claim 8 wherein the zeolite includes continuous channels, the zeolite containing conductive material within the channels.

10. The polymer-electrolyte-fuel cell assembly of claim 9 wherein the conductive material comprises alkali metal cations.

11. The polymer-electrolyte-fuel cell assembly of claim 9 wherein the conductive material comprises a conductive polymer.

12. The polymer-electrolyte-fuel cell assembly of claim 11 wherein the conductive polymer is selected from the group consisting of polyacetylene, polypyrrole, polythiophene, polyaniline and mixtures thereof.

13. The polymer-electrolyte-fuel cell assembly of claim 8 wherein the catalyst support material further comprises carbon particles mixed with the zeolite material.

14. The polymer-electrolyte-fuel cell assembly of claim 8 wherein the catalyst support material further comprises carbon particles, the carbon particles being layered adjacent to zeolite particulate material.

15. The polymer-electrolyte-fuel cell assembly of claim 8 wherein both the first and second electrode comprise catalyst support material comprising conductive zeolite particulate material.

* * * * *